United States Patent
Hosoi et al.

[11] Patent Number: 5,950,499
[45] Date of Patent: Sep. 14, 1999

[54] STEERING WHEEL ASSEMBLY AND A MOUNTING STRUCTURE AND BOSS STRUCTURE OF THE STEERING WHEEL ASSEMBLY

[75] Inventors: Akio Hosoi, Komaki; Atsushi Nagata, Inazawa; Katsunobu Sakane, Ichinomiya; Tetsuya Takamori, Konan; Hitoshi Yamamoto, Tsushima; Takanori Mizuno, Owariasahi, all of Japan

[73] Assignee: Toyoda Gosei Co., Ltd., Aichi-ken, Japan

[21] Appl. No.: 09/175,463

[22] Filed: Oct. 20, 1998

Related U.S. Application Data

[62] Division of application No. 08/795,793, Feb. 5, 1997, Pat. No. 5,855,145.

[30] Foreign Application Priority Data

| Feb. 26, 1996 | [JP] | Japan | 8-038241 |
| Mar. 13, 1996 | [JP] | Japan | 8-055804 |
| Mar. 13, 1996 | [JP] | Japan | 8-055805 |

[51] Int. Cl.[6] .............. B62D 1/04; B05G 1/10; B25G 3/00
[52] U.S. Cl. .............. 74/552; 280/779; 403/359; 403/259
[58] Field of Search .............. 74/552; 280/731, 280/736, 741, 779, 728.2; 403/359, 299, 362, 259

[56] References Cited

U.S. PATENT DOCUMENTS

| 4,624,596 | 11/1986 | Eckendorff . |
| 4,685,848 | 8/1987 | Langer . |

(List continued on next page.)

FOREIGN PATENT DOCUMENTS

| 2-058-694 | 4/1981 | European Pat. Off. . | |
| 0 475 183 | 3/1992 | European Pat. Off. | 74/552 |
| 0 685 379 A1 | 12/1995 | European Pat. Off. . | |
| 2 614 951 | 11/1988 | France . | |
| 1 015 704 | 9/1957 | Germany . | |
| 1 094 610 | 12/1960 | Germany . | |
| 60-60065 | 4/1985 | Japan . | |
| 62-149552 | 7/1987 | Japan | 74/552 |
| 63-134368 | 6/1988 | Japan . | |
| 2-133955 | 11/1990 | Japan . | |
| 4-95569 | 3/1992 | Japan . | |
| 5-2388 | 1/1993 | Japan . | |
| 655837 | 8/1951 | United Kingdom | 74/552 |
| 2 101 092 | 1/1983 | United Kingdom . | |
| 2 282 574 | 4/1995 | United Kingdom | 74/552 |

OTHER PUBLICATIONS

Kizu, Japanese Publication Abstract; Publication No. 59–160666; Sep. 1984.

Ito, Japanese Publication Abstract, Publication No. 4–218466; Aug. 1992.

Tetsuya, Patent Abstract of Japan, Publication No. 06285607; Oct. 11, 1994.

*Primary Examiner*—Vinh T. Luong
*Attorney, Agent, or Firm*—Pillsbury Madison & Sutro LLP

[57] ABSTRACT

The steering wheel assembly disclosed herein is mountable on a steering shaft and includes at least a bolt, a boss, and a steering wheel body. The boss is adapted to be fitted on the steering shaft and includes a cylindrical portion and a yoke portion formed integrally with the cylindrical portion. The cylindrical portion has a boss serration corresponding to a serration of the steering shaft. The yoke portion has through holes formed near both ends thereof. The steering wheel body includes a ring core bar, spoke core bars coupled to the ring core bar, sheaths covering the ring core bar and spoke core bars, and a pad formed integrally with the sheaths. Part of the spoke core bars are connected to the boss. The bolt has and external thread that is receivable by the through holes and engageable with internal threads of at least one of the through holes so as to permit the boss, to which the steering wheel body is connected, to be fixed on the steering shaft. The boss includes a boss body and flange formed integrally with the boss body. The boss body includes the cylindrical and yoke portions. The boss flange has a larger area than the yoke portion and is embedded in the spoke core bars.

5 Claims, 10 Drawing Sheets

U.S. PATENT DOCUMENTS

| | | |
|---|---|---|
| 4,893,520 | 1/1990 | Endo et al. . |
| 4,899,611 | 2/1990 | Pinna . |
| 4,955,744 | 9/1990 | Barth et al. . |
| 5,024,464 | 6/1991 | Kawaguchi et al. ............... 280/731 |
| 5,144,861 | 9/1992 | Nishijima et al. . |
| 5,267,486 | 12/1993 | Niwa et al. ............... 74/552 |
| 5,536,106 | 7/1996 | Landis et al. . |
| 5,588,337 | 12/1996 | Milton . |
| 5,617,763 | 4/1997 | Cymbal . |
| 5,692,770 | 12/1997 | Scharboneau et al. ............... 74/552 X |
| 5,816,112 | 10/1998 | Hosoi et al. ............... 74/552 |
| 5,832,787 | 11/1998 | Heilig ............... 74/552 |
| 5,848,806 | 12/1998 | Hosoi et al. ............... 228/779 |

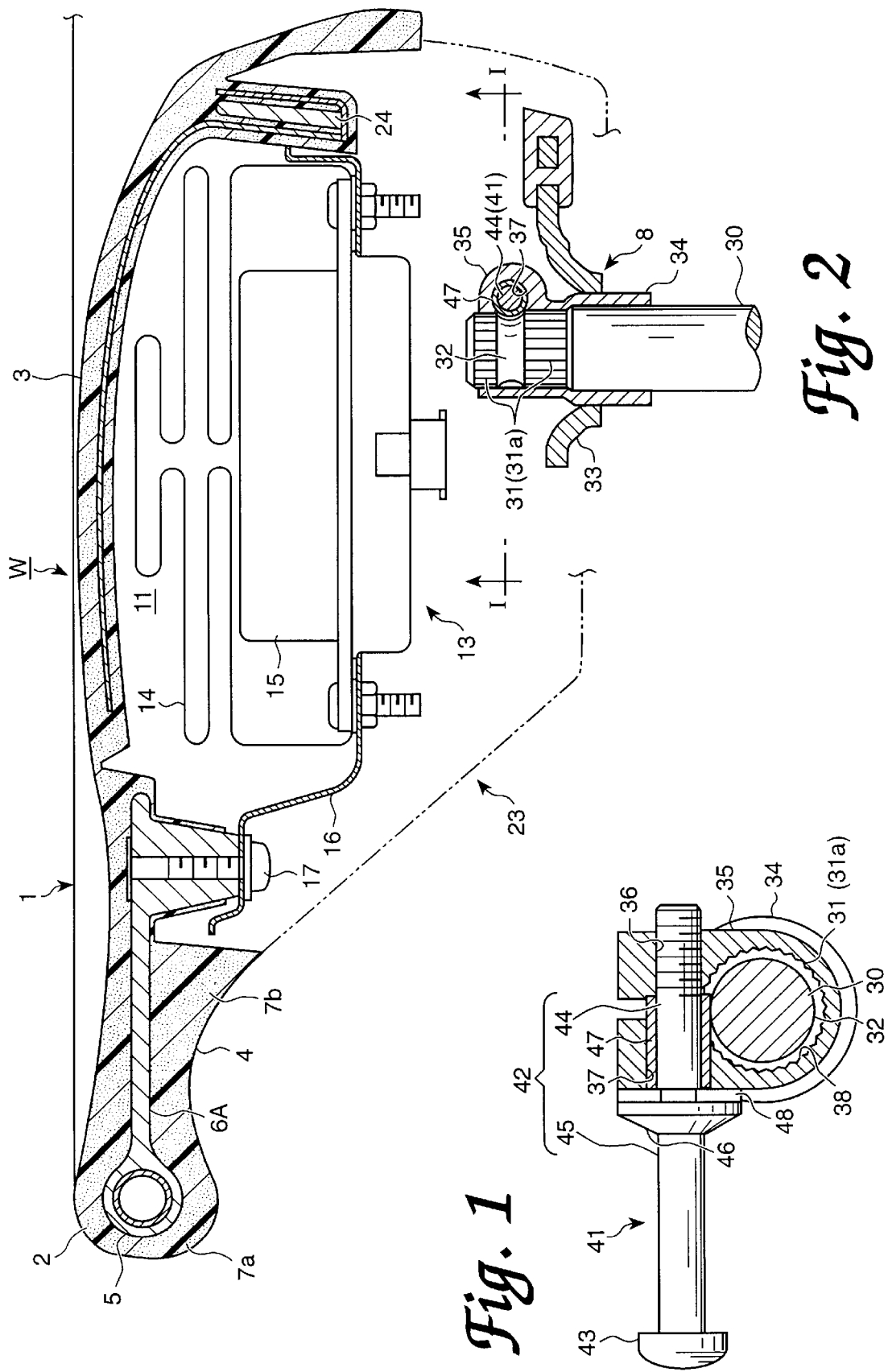

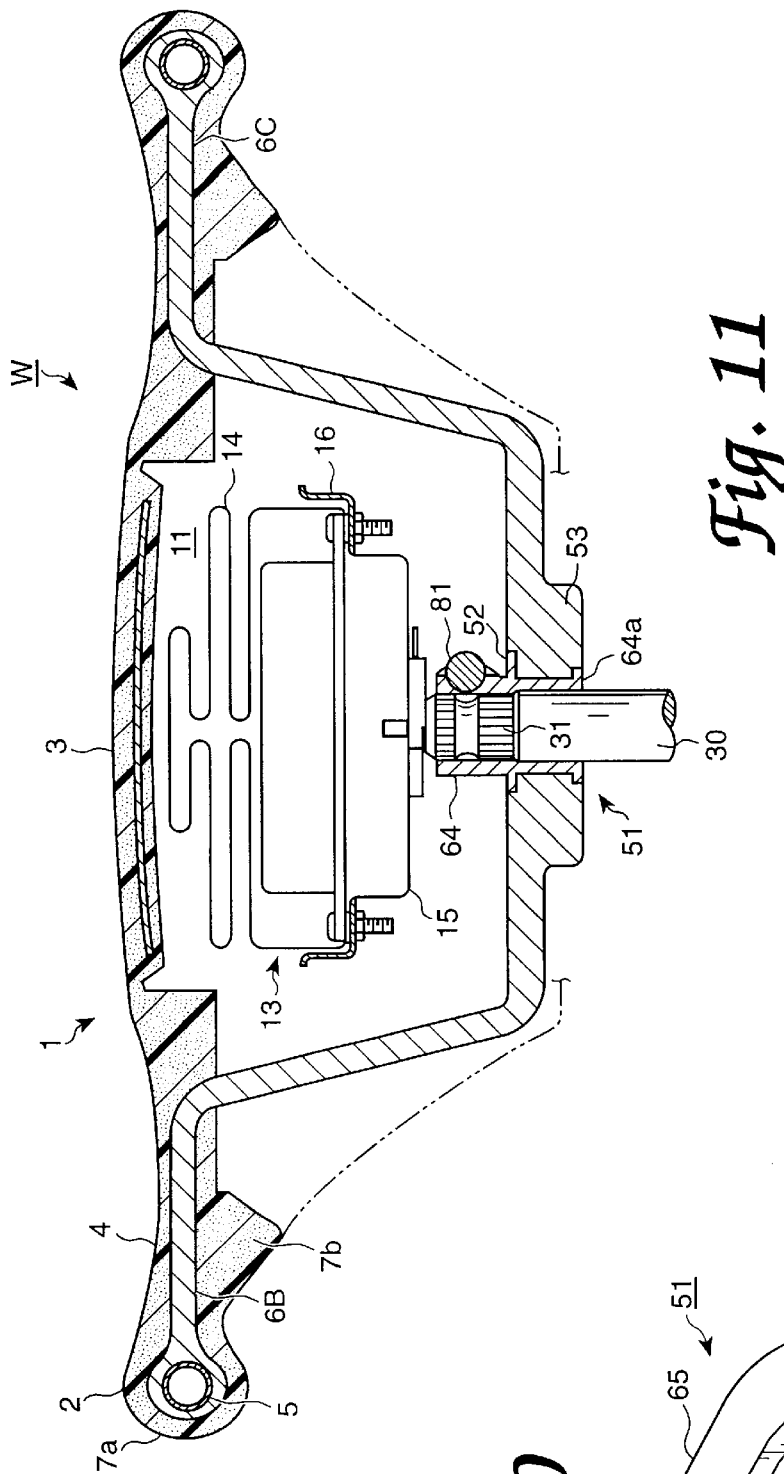
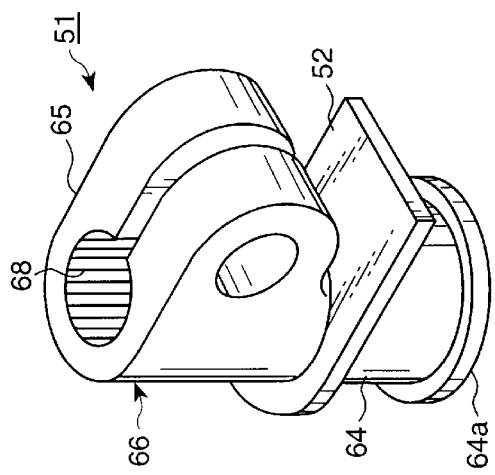
Fig. 11
Fig. 10

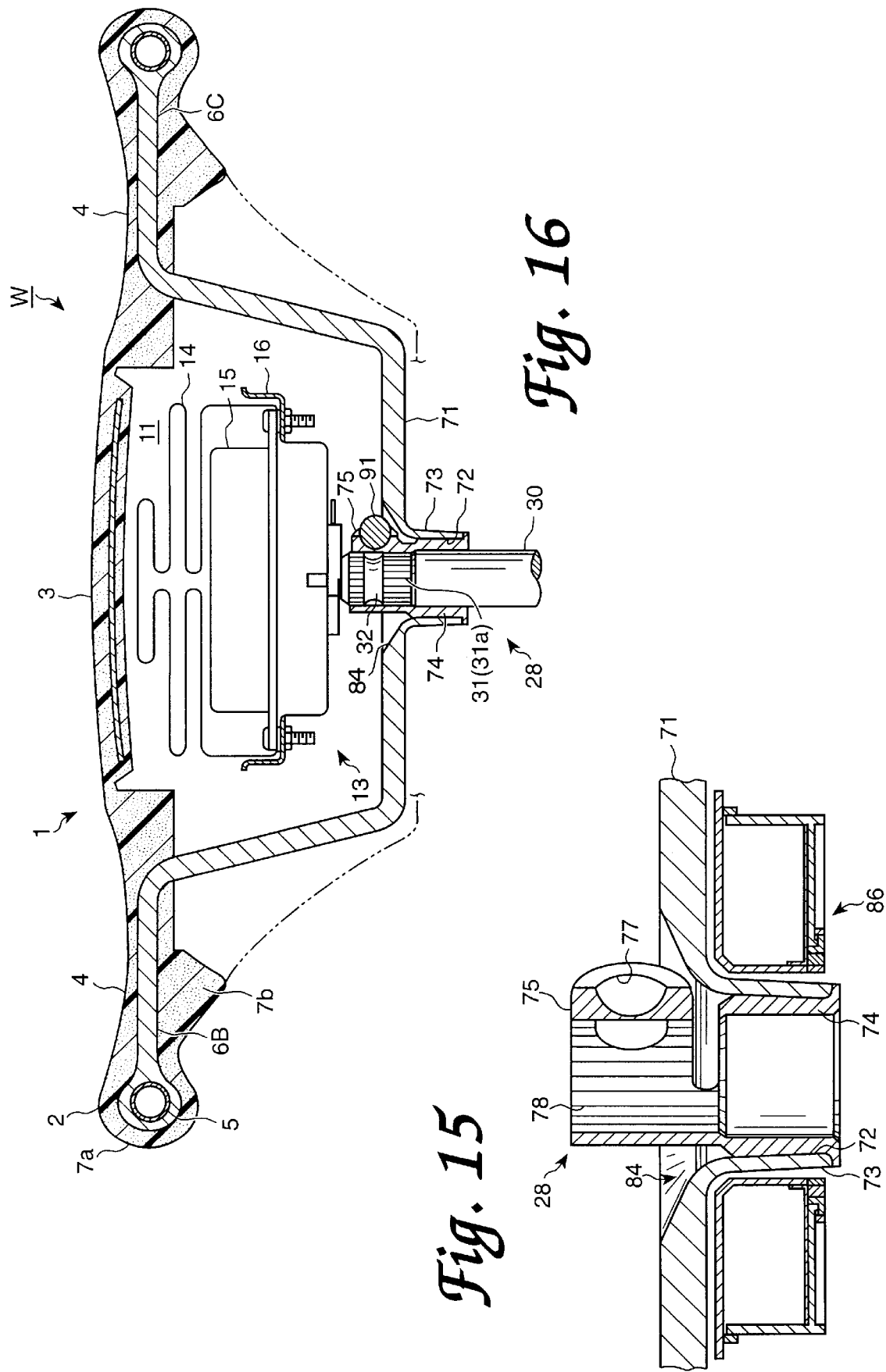

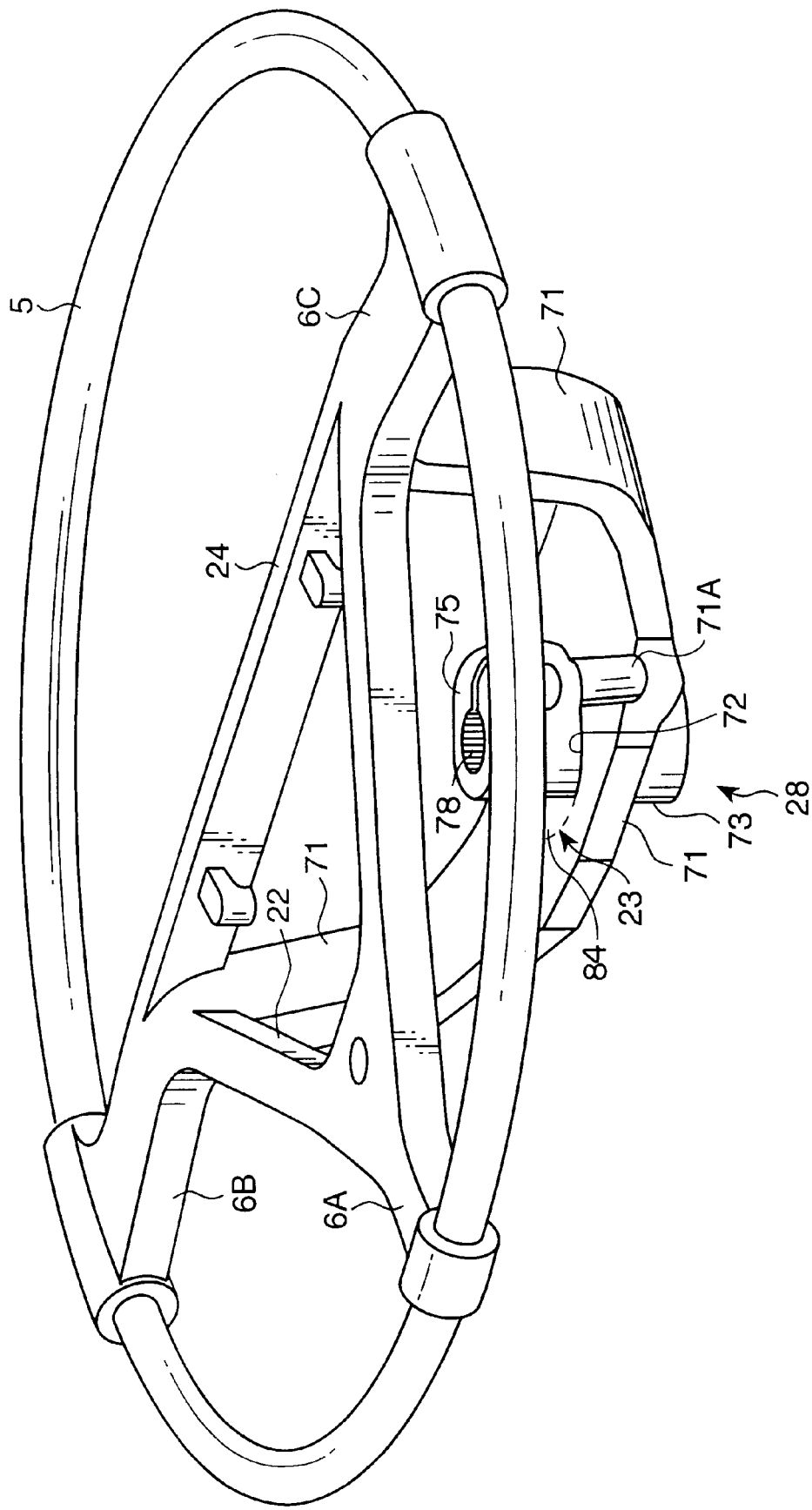

STEERING WHEEL ASSEMBLY AND A MOUNTING STRUCTURE AND BOSS STRUCTURE OF THE STEERING WHEEL ASSEMBLY

This is a division of application Ser. No. 08/795,793 filed Feb. 5, 1997, now U.S. Pat. No. 5,855,145 issued on Jan. 5, 1999.

BACKGROUND OF THE INVENTION

1. Field of the Invention

This invention relates to a steering assembly, a mounting structure thereof and a boss structure thereof.

2. Description of the Related Art

A steering wheel comprises an annular ring, a pad disposed in the center of the ring and spokes extending from the ring to the pad. A ring core bar is embedded in the ring, while spoke core bars are embedded in the spokes. In this case, the ring and spoke core bars are covered with a sheath made of polyurethane foam, for example. Distal ends of the spoke core bars are connected to a boss plate (boss) below the pad. The boss has a through hole with a serration on an inner periphery thereof so that the boss is fitted on an end of a steering shaft formed with the same serration and mounted thereon by tightening a nut.

In the steering wheel with such construction, the spoke core bars and hence the boss integrated with a steering wheel main body are mounted on the steering shaft by tightening the nut. Thereafter an air bag device and the like are attached and the pad is fitted to cover them.

On the other hand, recently there has been proposed a steering wheel of the type that a sheath and a pad are formed integrally to eliminate a border line between the sheath and pad (Japanese Utility Model Unexamined Publication No. 2-133955, for example). According to such technology, since the sheath and the pad can be integrated, it is possible to improve the design.

However, according to the above technology, it is very difficult to tighten a nut after fitting the steering wheel main body on the end of the steering shaft. This is because the top of the steering wheel main body is not open since the pad is integral with the sheath.

In contrast, it can be thought to adopt a yoke type boss so as to tighten the steering wheel from the side thereof with a bolt. Namely, the yoke type boss includes a cylindrical portion having a serration corresponding to the serration of the steering shaft formed on an inner periphery thereof and a yoke portion formed integrally with the cylindrical portion. The yoke portion is of generally C-shape in plan and is formed with through holes substantially at both ends thereof. At least one of the through holes is formed with an internal thread. Meanwhile, the steering shaft is formed with a constricted portion in the position corresponding to the through holes.

By screwing the bolt into the through holes, the serrations are caused to mesh with each other and the yoke portion is tightened. This contributes to restraining the steering wheel from moving in the direction of rotation. At the same time, a shaft of the bolt is fitted in the constricted portion. This contributes to restraining the steering wheel from moving in the vertical direction as well. As a consequence, according to such technology, even in the steering wheel in which the pad is integral with the sheath, the mounting operation can be performed relatively easily.

However, in the above-described conventional technology, the shaft of the bolt by which the steering wheel and the steering shaft are connected is designed to be fitted directly in the constricted portion of the steering shaft. Therefore, when external stress is applied to the steering wheel, stress strain between the steering wheel and the steering shaft is transmitted directly to the bolt. As a result, there has been an apprehension that after assembling the steering wheel, the tightened bolt might be loosened or the threaded portion (internal or external thread) might be damaged.

In the field of steering wheels, it is common to make spoke core bars and the like of die-cast aluminum so as to make the steering wheel lighter as a whole. In this case, it is necessary to connect aluminum spoke core bars to an iron boss. In the case of the usual boss (formed in a generally cylindrical shape), a preformed boss is set in a mold for die casting as an insert and, in this condition, molten aluminum is poured into the mold. Then, the core bars can be formed in such a manner that the periphery (extreme edge) of the boss is connected to the spoke core bars, that is, the extreme edge of the boss is embedded in aluminum to form the core bars.

However, such technology could not be applied as it was in cases where the above yoke-type boss was formed in a generally C-shaped in plan so as to allow molten aluminum to go around through an opening of the yoke portion.

The above conventional technology, however, needed to have such a configuration in that it prevents molten aluminum from going around to the inside of the boss when casting the spoke core bars. For this reason, the shape itself was limited, resulting in low degree of freedom in its shape.

Particularly, in cases where the yoke type boss was adopted (which has a yoke portion for bolt tightening formed on the cylindrical portion to be generally C-shaped in plan), the above die casting technology could not be applied as it was. This is because the yoke portion of the boss is generally C-shaped in plan, so that molten aluminum goes around through the opening of the yoke portion at the time of die casting.

On the other hand, Japanese Patent Unexamined Publication No. 60-60065 discloses a technology in which spoke core bars are connected to each other by means of a connecting portion with a through hole in which the boss is to be fitted. Fixing of the boss is performed by caulking a peripheral edge of the through hole of the connecting portion. According to this technology, the boss can be fixed to the connecting portion after connecting the spoke core bars to each other, and therefore the degree of freedom in shape of the boss itself can be further increased.

However, in this technology, since the peripheral edge of the through hole of the connecting portion is simply caulked from the outside, there is the risk of easy rotation of the boss, resulting in difficulty in ensuring sufficient joining strength between the boss and the core bars. This gives rise to a problem with respect to stability of mounting condition.

SUMMARY OF THE INVENTION

An object of the present invention is to provide a steering wheel mounting structure which is capable, in a steering wheel of the type that a sheath covering ring and spoke core bars is formed integrally with a pad, of simplifying assembling as well as of ensuring the stability of mounting condition.

Another object of the invention is to provide a steering wheel of the type that a sheath covering ring and spoke core bars are formed integrally with a pad and a yoke type boss is adopted, which is capable of reducing weight by the use of spoke core bars made of die-cast aluminum while making direct connection between the boss and die-cast aluminum.

Still another object of the invention is to provide a steering wheel and a boss structure thereof which is capable, in a steering wheel of the type that at least spoke core bars are made of die-cast aluminum so as to reduce weight, of increasing the degree of freedom in shape of the boss as well as of ensuring the stability of mounting condition.

To achieve the above objects, according to the present invention, there is provided a steering wheel mounting structure for fixing a steering wheel on a steering shaft. The steering wheel comprises a boss adapted to be fitted on the steering shaft with a serration made up of a plurality of teeth and a constricted portion formed on an outer periphery thereof. The boss includes a cylindrical portion with a serration corresponding to the serration of the steering shaft on an inner periphery thereof and a yoke portion integral with the cylindrical portion and having through holes substantially at both ends thereof. At least one of the through holes is formed with an internal thread. A steering wheel body is provided which includes a ring core bar, spoke core bars, sheaths covering the core bars, and a pad formed integrally with the sheaths and located in a substantially central upper portion of a ring. Part of the spoke core bars are connected to the boss. A bolt with an external thread formed at least approximately on an end thereof is screwed into the through holes to fix the steering wheel on the steering shaft. The steering wheel mounting structure comprises a cylindrical collar provided around the bolt and is adapted to be fitted in the constricted portion of the steering shaft.

According to the invention, there is also provided a steering wheel comprising a boss adapted to be fitted on a steering shaft having a serration made up of a plurality of teeth formed on an outer periphery thereof. The boss includes a cylindrical portion with a serration corresponding to the serration of the steering shaft on an inner periphery thereof and a yoke portion integral with the cylindrical portion and having through holes substantially at both ends thereof, at least one of the through holes being formed with an internal thread. The steering wheel includes a steering wheel body having a ring core bar, spoke core bars, sheaths covering the core bars, and a pad formed integrally with the sheaths and located in a substantially central upper portion of a ring. Part of the spoke core bars are connected to the boss. A bolt with an external thread formed at least approximately on an end thereof is screwed into the through holes so as to fix the boss, to which the steering wheel body is connected, on the steering shaft. At least the spoke core bars are made of die-cast aluminum. The boss comprises a boss body including the cylindrical portion and the yoke portion and a boss plate fixed by welding to the boss body and having a larger area than the yoke portion, and the extreme edge of the boss plate is embedded in the spoke core bars.

Further according to the invention, there is provided a steering wheel comprising a boss adapted to be fitted on a steering shaft having a serration made up of a plurality of teeth formed on an outer periphery thereof. The boss includes a cylindrical portion with a serration corresponding to the serration of the steering shaft on an inner periphery thereof and a yoke portion provided integral with the cylindrical portion and having through holes substantially at both ends thereof. At least one of the through holes is formed with an internal thread. A steering wheel body is provided and includes a ring core bar, spoke core bars, sheaths covering the core bars, and a pad formed integrally with the sheaths and located in a substantially central upper portion of a ring. Part of the spoke core bars are connected to the boss. A bolt with an external thread formed at least approximately on an end thereof is screwed into the through holes so as to fix the boss, to which the steering wheel body is connected, on the steering shaft; at least the spoke core bars are made of die-cast aluminum. The boss comprises a boss body including the cylindrical portion and the yoke portion and a flange formed integrally with the boss body and having a larger area than the yoke portion, and the flange is embedded in the spoke core bars.

According to the invention, there is provided a steering wheel boss structure comprising a boss adapted to be fitted and fixed on a steering shaft and having at least a generally cylindrical shape; a plurality of spoke core bars made of die-cast aluminum and extending from an annular ring core bar toward approximately the center; and a connecting portion formed integrally with the spoke core bars so as to connect the spoke core bars to each other while being connected to the boss. The connecting portion is formed with a tapered through hole therein. The boss is press-fitted in the through hole, and at least a tapered distal end of the boss is increased in diameter so that the boss is fixed to the connecting portion.

Incidentally, in the text of this specification, "vertical direction of steering wheel" does not necessarily mean the vertical direction of the steering wheel in a state of being mounted on a vehicle, but means the axial direction of the steering shaft.

In accordance with the present invention, the boss connected with the steering wheel body is fitted on the steering shaft having the serration made up of plural teeth and the constricted portion formed on the outer periphery thereof in such a manner that the serration formed on the inner periphery of the cylindrical portion of the boss meshes with the serration of the steering shaft. Then the bolt is screwed into the through holes of the yoke portion. This screwing causes the serrations to further mesh with each other and the yoke portion to be tightened, so that the steering wheel is restrained from moving in the direction of rotation with respect to the steering shaft. Further, basically, the steering wheel is restrained from moving in the vertical direction due to insertion of the bolt into the constricted portion of the steering shaft. Owing to these restraints, the steering wheel can be fixed on the steering shaft. As described above, due to adoption of the yoke type boss, the steering wheel can be mounted relatively easily on the steering shaft even in cases where the pad is formed integrally with the sheath.

In the present invention, the cylindrical collar is provided on the outer periphery of the bolt and is fitted in the constricted portion of the steering shaft. Therefore, even if the external stress is applied to the steering wheel to give rise to strain stress between the steering wheel and the steering shaft, the stress is first transmitted to the collar. This avoids a disadvantage attributed to direct transmission of strain stress to the bolt.

In the present invention, the boss is formed by welding and fixing the boss plate having a larger area than the yoke portion to the boss body including the cylindrical portion and the yoke portion. When casting the core bars from aluminum, the boss plate serves as a seal in the die to restrain molten aluminum from going around to the inside of the boss through the opening of the yoke portion. Therefore, the extreme edge of the boss plate is embedded in the die-cast aluminum spoke core bars obtained by casting, thereby making it possible to obtain the integrated boss and core bars without fail.

According to the present invention, the boss having at least a generally cylindrical shape is fixedly fitted on the steering shaft. A plurality of spoke core bars extending from the annular ring core bar toward approximately the center thereof are connected to one another by means of the connecting portion formed integrally with the spoke core bars. Further, the connecting portion is connected to the boss as well. The spoke core bars and the connecting portion are made of die-cast aluminum, which contributes to making the whole steering wheel lightweight.

In the present invention, when obtaining such boss structure, the spoke core bars and the connecting portion are first formed into a predetermined shape by die casting. At this time, the connecting portion is formed with the tapered through hole. Then, the boss formed separately is press-fitted in the through hole. Further, at least the tapered distal end of the boss is increased in diameter. This causes the boss to be fixed to the connecting portion.

As described above, in the present invention, unlike the conventional technology in which the spoke core bars were formed by die casting with the boss set in the die as an insert, it will do to fix the boss after forming the core bars and the like. Therefore, even if the boss is of the type that has an opening, the boss structure of this invention can be materialized. Further, the boss can be firmly fixed to the connecting portion due to frictional force between the boss and the inner peripheral surface of the through hole and an increase in diameter of the tapered distal end of the boss.

Accordingly, the present invention exhibits an excellent effect that, in a steering wheel of the type that a sheath covering ring and spoke core bars is formed integrally with a pad, the working property during assembly can be improved and the stability of mounting condition can be ensured.

The present invention also exhibits an outstanding effect that, in a steering wheel of the type that a sheath covering ring and spoke core bars is formed integrally with a pad and a yoke type boss, it can be made lightweight by the spoke core bars made of die-cast aluminum and direct connection between the boss and die-cast aluminum can be ensured.

Further, the present invention exhibits an excellent effect that, in a steering wheel of the type that at least the spoke core bars are made of die-cast aluminum so as to make the steering wheel lightweight and a boss structure thereof, the degree of freedom in shape of the boss can be increased and the stability of mounting condition can be ensured.

BRIEF DESCRIPTION OF THE DRAWINGS

FIG. 1 is a sectional view taken along line I—I in FIG. 2 showing essential portions of a steering wheel mounting structure according to a first embodiment of the invention;

FIG. 2 is a sectional view taken along the line II—II of FIG. 3;

FIG. 4 is a sectional view taken along line IV—IV in FIG. 3 of a steering wheel body and the like showing a manner of installing an air bag device and the like;

FIG. 10 is a perspective view of a boss according to a second embodiment of the invention;

FIG. 11 is a sectional view of a steering wheel of the invention;

FIG. 13 is a fragmentary sectional view of a die for forming the connecting portion and the like;

FIG. 15 is a sectional view of a steering wheel boss structure according to a third embodiment of the invention;

FIG. 16 is a sectional view of a steering wheel of the invention;

FIG. 17 is a perspective view of core bars and the like;

DESCRIPTION OF THE PREFERRED EMBODIMENTS

Figure 3:
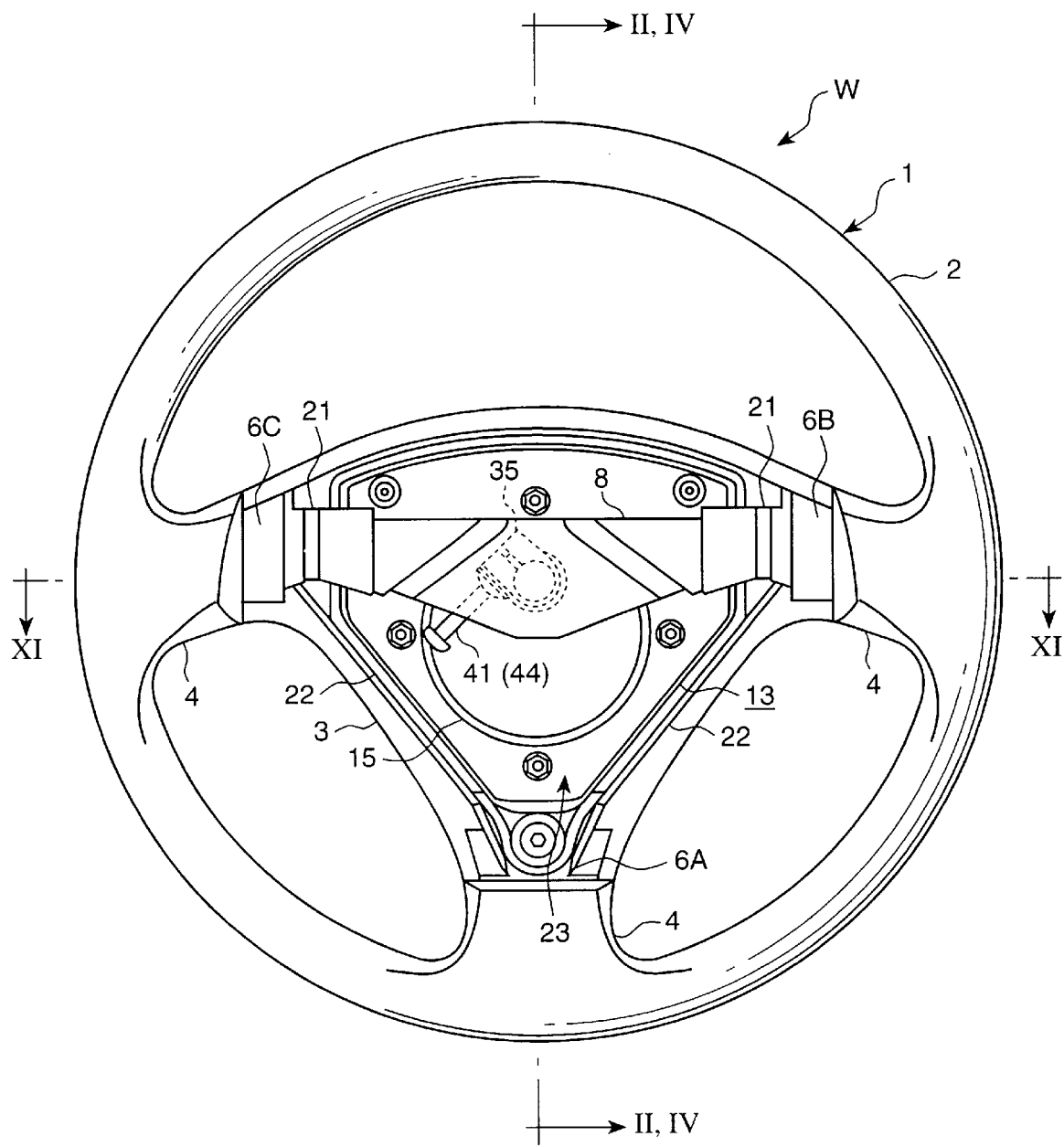
FIG. 3 is a rear view of a steering wheel.

Now, a first embodiment of the present invention will be described with reference to the drawings. FIG. 3 is a rear view of a steering wheel W of this embodiment, and FIG. 2 is a sectional view taken along the line II—II of FIG. 3.

Referring to the drawings, a steering wheel body 1 of the steering wheel W comprises an annular ring 2, a pad 3 disposed in the center of the ring 2, and three spokes 4 extending from the ring 2 to the pad 3. This embodiment can also be materialized in a steering wheel having two or not less than four spoke core bars. The ring 2 is constituted by a ring core bar 5 made of steel pipe, for example, and a sheath 7a covering the ring bar 5, while the spokes 4 are constituted by spoke core bars 6A, 6B, 6C made of lightweight die-cast metal such as aluminum alloy and a sheath 7b covering them. The sheaths 7a, 7b and the pad 3 are integrally made of soft synthetic resin (such as polyurethane foam). The steering wheel body 1 is assembled and fixed to a boss 8. This assembling structure will be described below in detail.

Below the pad 3 is formed a concave housing portion 11 enclosed by the sheath 7b. In the concave housing port ion 11 are disposed a membrane switch (not shown) and an air bag device generally indicated at 13. The membrane switch has upper and lower thin plates constituting a part of a horn switch circuit (not shown) so that depressing of the pad 3 brings the thin plates into contact with each other to sound a horn.

The air bag device 13 comprises an air bag 14 stored in a folded state, an inflator 15 for filling the air bag 14 with gas for expansion, and a bag holder 16 on which the air bag 14 and the inflator 15 are held and fixed. The bag holder 16 is fixed to the spoke core bar 6A or the like with screws 17 as shown in FIG. 2, for example. The present invention can also be materialized in a steering wheel of the type that has a shock absorbing member instead of the air bag device 13.

The boss 8 is integral with the steering wheel body 1. Namely, the boss 8 is connected to the right and left spoke core bars 6B, 6C through connecting portions 21; however, the boss 8 is located below the ring core bar 5 and the spoke core bars 6B, 6C.

The spoke core bars 6B, 6C are connected to the remaining spoke core bar 6A (adjacent to a driver) by means of sub-connecting portions 22. Due to this structure, the spoke core bars 6A–6C, the ring core bar 5 and the boss 8 are firmly connected to one another; and A relatively large opening 23 is defined by the boss 8, the connecting portions 21 and the auxiliary connecting portions 22 on the driver side of the boss 8. Further, the spoke core bars 6B, 6C are connected to each other by means of a support bar 24 (see FIG. 2) so as to secure stability when the air bag 14 is inflated. The connecting portions 21, the auxiliary connecting portions 22 and the support bar 24 are made of die-cast aluminum like the spoke core bars 6A–6C.

In this embodiment, a plastic lower cover (not shown) is provided to enclose the underside of the steering wheel body 1.

Now, description will be given of the details of a mounting structure of the steering wheel W (features of this embodiment).

As shown in FIGS. 1, 2, 5 and 7, a steering shaft 30 is formed at a distal end portion thereof with a serration 31 having a predetermined number of (approx. thirty, in general) teeth 31a, and an annular groove 32 constituting a constricted portion is formed in a vertically middle portion of the serration 31. Alternatively, the steering shaft 30 may be formed with the annular groove 32 partially along the circumference instead of being formed along the entire circumference. Meanwhile, the boss 8 comprises a tabular boss plate 33, a steel cylindrical portion 34 fixed by welding to the inner periphery of a through hole formed in the center of the plate 33, and a yoke portion 35 formed in an upper portion of the cylindrical portion 34 so as to be generally C-shaped in plan. The extreme edge of the boss plate 33 is partially embedded in the spoke core bars 6A–6C. Owing to this embedding, the boss 8 and the spoke core bars 6A–6C are connected to each other. The C-shaped yoke portion 35 is formed approximately at both ends thereof with through holes 36, 37 having different inside diameters, respectively. The through hole 36 of smaller diameter is formed with an internal thread. Further, the cylindrical portion 34 is formed at an inner peripheral surface thereof with a serration 38 corresponding to the serration 31 of the steering shaft 30. The cylindrical portion 34 is fitted on the end of the steering shaft 30 in such a manner that the serrations 31, 38 mesh with each other. Further, a bolt 41 is inserted into the through holes 36, 37 and screwed particularly in the through hole 36 of smaller diameter.

Figure 6:
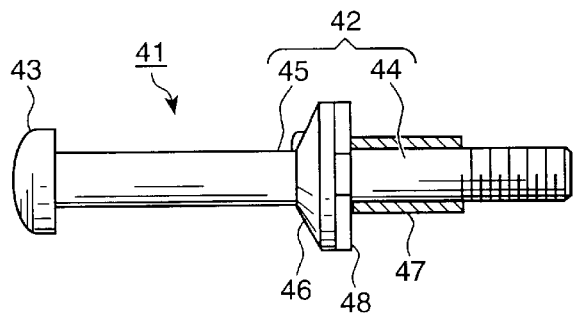
FIG. 6 is a sectional view of a bolt of a steering wheel.
Figure 7:
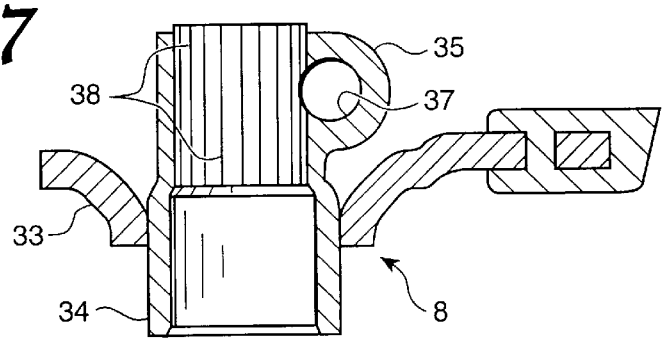
FIG. 7 is a vertical sectional view showing a construction of a boss of a steering wheel.

More specifically, as shown in FIG. 6, the bolt 41 includes a shaft 42 and a head 43, the shaft 42 being formed on one end portion thereof with an external thread. The shaft 42 is constituted by a general shaft portion 44 located on the external thread side and an extended shaft portion 45, and an enlarged diameter portion 46 is integrally formed between the general shaft portion 44 and the extended shaft portion 45. Alternatively, the extended shaft portion 45 and the enlarged diameter portion 46 may be dispensed with.

Further, in this embodiment, a cylindrical collar 47 made of steel, like the bolt 41, is fitted on the general shaft portion 44 in a position between the external thread and the enlarged diameter portion 46. In addition, a washer 48 is interposed between the collar 47 and the enlarged diameter portion 46. Therefore, the collar 47 is kept immovably fixed between the enlarged diameter portion 46 (washer 48) and the external thread. Alternatively, the washer 48 may be dispensed with.

In this embodiment, as shown in FIG. 1, it is not the general shaft portion 44 of the bolt 41 but the collar 47 that is fitted in the annular groove 32 of the steering shaft 30. In this way, the boss 8 is firmly fixed to the distal end of the steering shaft 30 by means of the bolt 41, with the result that the steering wheel W is mounted on the steering shaft 30.

Now, description will be given of how to mount the steering wheel W on the steering shaft 30.

First, the cylindrical portion 34 is fitted in the through hole of the boss plate 33 and welding is performed to couple the two, thereby to constitute the boss 8. On the other hand, the ring core bar 5 is formed separately.

Subsequently, the thus-obtained boss 8 and ring core bar 5 are set in a die (not shown). At this time, a cavity for forming the spoke core bars 6A–6C and the like (including the connecting portions 21, the sub-connecting portions 22 and the support bar 24) is defined to be isolated from the yoke portion 35 due to the presence of the boss plate 33. Then, molten aluminum is poured into the cavity to fill it up. In this case, owing to the presence of the boss plate 33, the molten aluminum is prevented from going around to the yoke portion 35 within the die. Therefore, as shown in FIG. 2, die-cast aluminum is molded in such a manner that the extreme edge of the boss plate 33 is embedded therein, with the result that the spoke core bars 6A–6C and the like are obtained.

Figure 4:
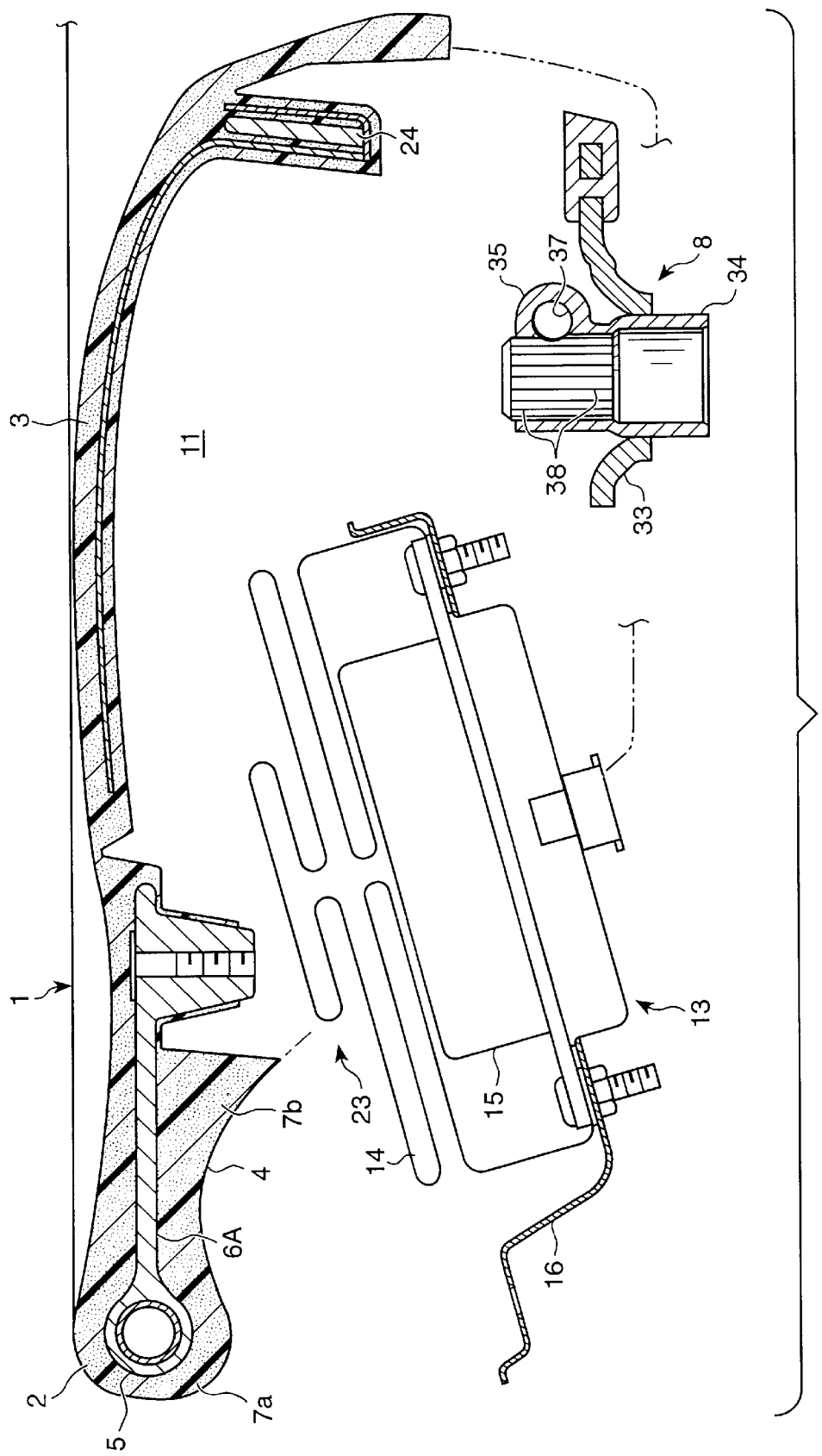
Figure 5:
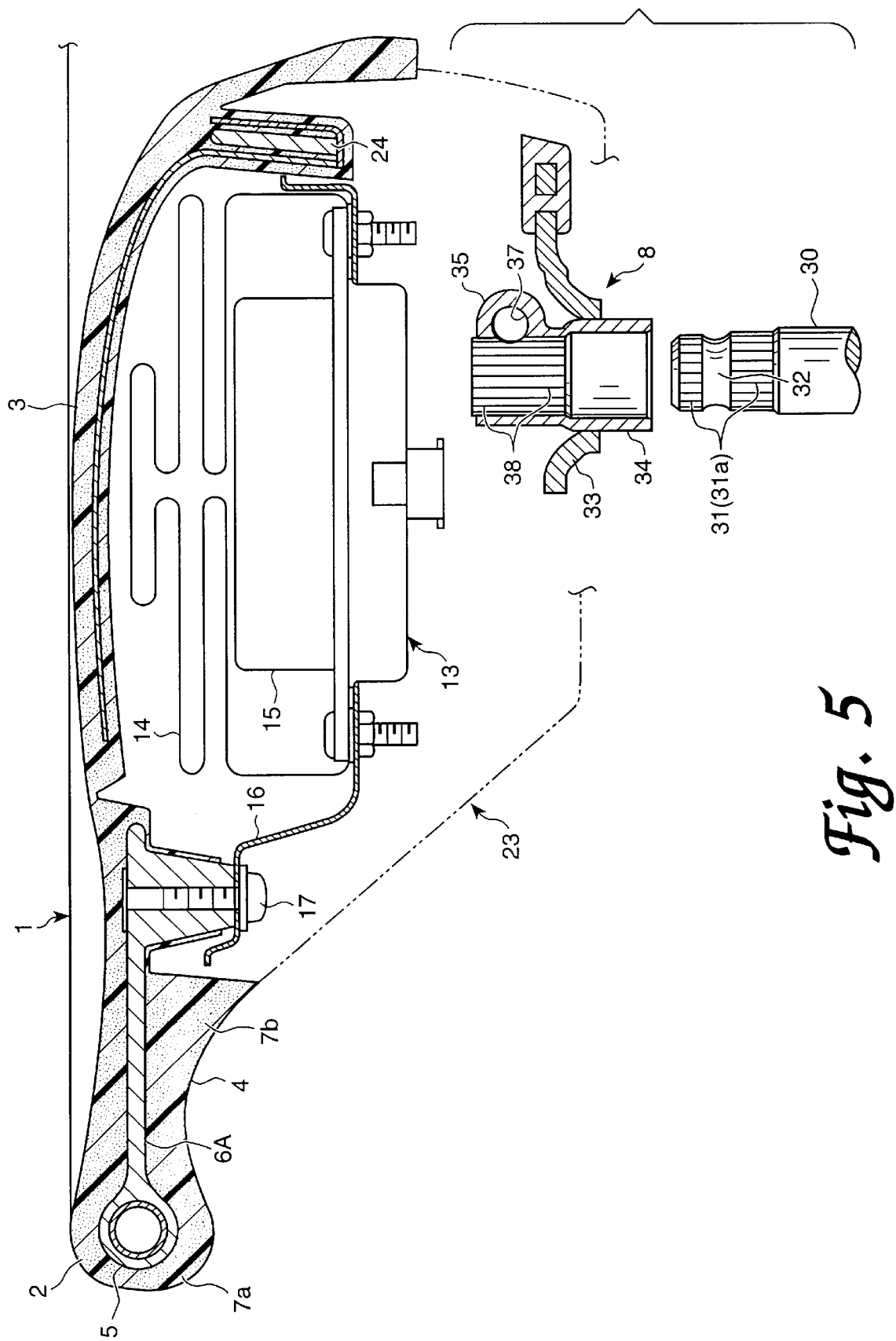
FIG. 5 is a sectional view for explanation of a process for mounting the steering wheel on a steering shaft.

Succeedingly, as shown in FIG. 4, the membrane switch and the air bag device 13 are inserted through the opening 23 defined by the boss 8, the connecting portions 21 and the sub-connecting portions 22, and the bag holder 16 of the air bag device 13 is fixed to the spoke core bar 6A and the like by means of screws 17 (see FIGS. 2 and 5). In this case, since the opening 23 is relatively large, the air bag device 13 can be easily mounted in the steering wheel main body 1.

Thereafter, as shown in FIG. 5, the boss 8 integrated with the steering wheel body 1 is fitted on the distal end of the steering shaft 30 in such a manner that the serration 31 of the steering shaft 30 and the serration 38 formed in the cylindrical portion 34 of the boss 8 mesh with each other.

Figure 8:
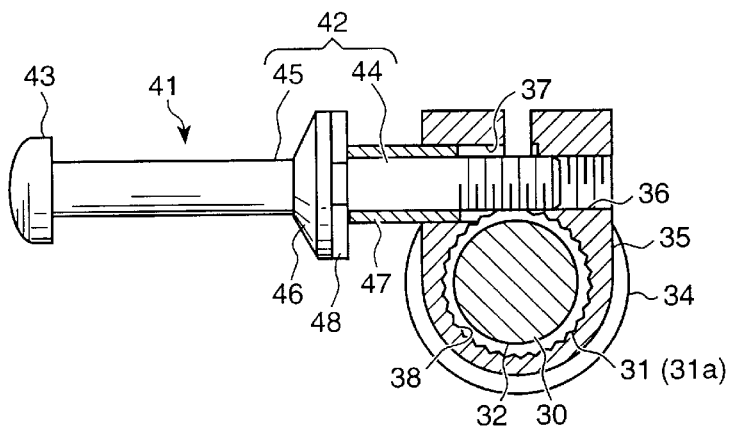
FIG. 8 is a sectional view of the boss and the like showing a manner of threadedly engaging the bolt.
Figure 9:
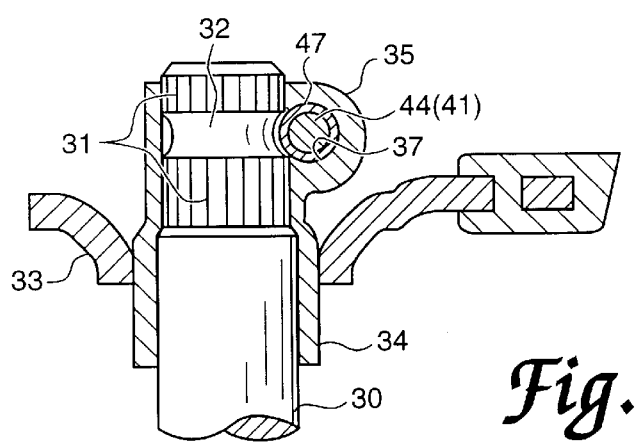
FIG. 9 is a vertical sectional view showing essential portions of a steering wheel mounting structure.

In this condition, the bolt 41 integrated with the collar 47 is inserted into the through holes 37, 36 of the yoke portion 35, as shown in FIG. 8. In this embodiment, the collar 47 is so designed as to be inserted only through the through hole 37 of larger diameter but it may be made longer so as to be partially inserted into the other through hole 36. In this case, however, it is necessary to provide a projection or the like to ensure a sufficient thread tolerance. The external thread of the bolt 41 is screwed in the through hole 36 formed with the internal thread. This screwing causes the serrations 31, 38 to further mesh with each other (or come into surface contact with each other) and the yoke portion 35 to be tightened as shown in FIGS. 1 and 9, so that the boss 8 and hence the steering wheel W are restrained from moving in the direction of rotation with respect to the steering shaft 30. Further, the collar 47 on the outer periphery of the bolt 41 is inserted into (fitted in) the annular groove 32 of the steering shaft 30, so that the boss 8 and hence the steering wheel W are restrained from moving vertically. Owing to these restraints, the steering wheel W can be fixed on the steering shaft 30.

Description will now be given of a function and an effect of the first embodiment.

(a) As described above, in this embodiment, the cylindrical collar 47 is provided on the outer periphery of the bolt 41 and is fitted in the annular groove 32 of the steering shaft 30. Therefore, after assembling, even in cases where the external stress is applied to the steering wheel W to give rise to strain stress between the steering wheel W and the steering shaft 30, the stress is first transmitted to the collar 47. This prevents the strain/stress from being transmitted directly to the bolt 41. Accordingly, it is possible to avoid concerns that the tightening portion of the bolt 41 is loosened or the thread portion (external or internal thread) is damaged.

(b) In this embodiment, the collar 47 is immovably provided between the external thread and the enlarged diameter portion 46 (washer 48) of the bolt 41. Therefore, play between the collar 47 and the bolt 41 is not permitted, thereby making it possible to further stabilize the mounting condition.

(c) Since the collar 47 is made of the same material as the bolt 41, the collar 47 itself is hardly deformed or damaged by the strain/stress.

(d) In this embodiment, the bolt 41 has the extended shaft portion 45 so as to make an overall length thereof longer. As a consequence, the bolt 41 can be easily screwed from the side of the steering wheel W. As a result, the ease in mounting can be improved.

(e) As described above, in this embodiment, due to adoption of the yoke type boss 8, the steering wheel W can be mounted on the steering shaft 30 relatively easily even in cases where the pad 3 is formed integrally with the sheaths 7a, 7b.

(f) In this embodiment, the boss 8 is formed by welding and fixing the boss plate 33 having a larger area than the yoke portion 35 to the boss body composed of the cylindrical portion 34 and the yoke portion 35. When casting the spoke core bars 6A–6C from aluminum, the boss plate 33 serves as a seal in the die so that molten aluminum is prevented from going around to the inside of the boss 8 (cylindrical portion 34) through the opening of the yoke portion 35. Therefore, the extreme edge of the boss plate 33 can be embedded in the die-cast aluminum spoke core bars 6A–6C obtained by casting, with the result that the steering wheel W in which the boss 8 and the core bars 6A–6C are integral with each other can be obtained without fail.

(g) It is naturally possible to construct the spoke core bars 6A–6C from die-cast aluminum, and therefore an overall weight of the steering wheel can be reduced.

(h) In this embodiment, screwing of the bolt 41 causes the serrations 31, 38 to further mesh with each other (or come into surface contact with each other) and the yoke portion 35 to be tightened, so that it is possible to restrain the steering wheel W from moving in the direction of rotation with respect to the steering shaft 30. Further, since the bolt 41 is fitted in the annular groove 32 of the steering shaft 30, it is possible to restrain the boss 8 and hence the steering wheel W from moving vertically. As a consequence, the steering wheel W can be firmly fixed on the steering shaft 30.

Now, a second embodiment of the present invention will be described with reference to FIGS. 10–14. In the construction of this embodiment, the same components or members as those of the first embodiment are designated by the same reference numerals and explanation thereof is omitted. The following description places special emphasis on the differences of the second embodiment from the first embodiment.

In contrast with the first embodiment in which the boss 8 comprises the boss plate 33 and the boss body (composed of the cylindrical portion 34 and the yoke portion 35), a boss 51 of this embodiment comprises, as shown in FIG. 10, a boss body 66 having serration 68 and being composed of a cylindrical portion 64 and a yoke portion 65, and a flange 52 formed integrally with the cylindrical portion 64. The flange 52 is formed in a non-circular shape.

The boss 51 may be made by any method but it can be generally made by one of the methods including cold forging, hot forging, press working and machining or by a suitable combination of these methods. For instance, softened steel is roughly shaped with a die and then subjected to drilling, threading, slitting and the like, thereby making a boss. The serration 68 may be formed after molding die-cast aluminum to be described below. This makes it possible to prevent the serration 68 from being adversely affected by heat transfer at the time of casting.

In this embodiment, the cylindrical portion 64 is formed integrally with a flange portion 64a at the lowermost end thereof. Alternatively, the flange portion 64a may be dispensed with. The shapes of the flange 52 and the flange portion 64a are not limited to those of this embodiment.

Figure 12:
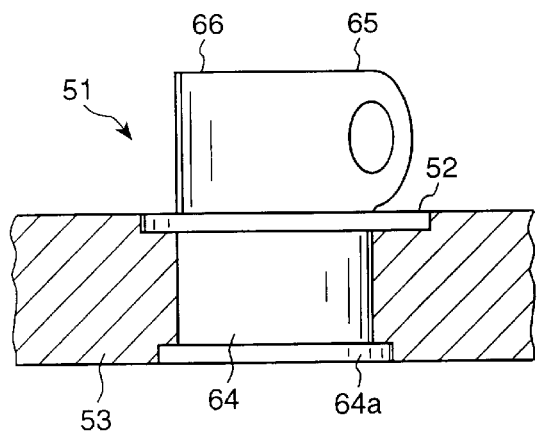
FIG. 12 is a sectional view showing the boss and a structure of a connecting portion of the invention.

As shown in FIGS. 11, 12, a die-cast aluminum connecting portion 53 is disposed around the cylindrical portion 64 in a position between the flange 52 and the flange portion 64a, and the connecting portion 53 is connected to the spoke core bars 6A–6C. In other words, the connecting portion 53 is made of die-cast aluminum in the same manner as the spoke core bars 6A–6C so as to be integral therewith.

Figure 13:
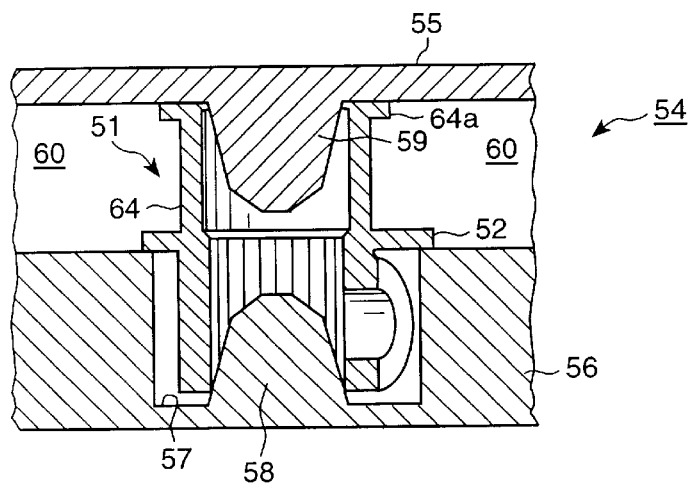

Now, description will be given of the method of forming the spoke core bars 6A–6C and the connecting portion 53 of the steering wheel W constructed as described above. As shown in FIG. 13, a die 54 consists of a first split die 55 and a second split die 56. The second split die 56 is formed with a concave portion 57 for housing the yoke portion 65 and a positioning projection 58. On the other hand, the first split die 55 is formed integrally with a positioning pin 59 which faces the positioning projection 58.

When forming the spoke core bars 6A–6C and the connecting portion 53, as shown in FIG. 13, the yoke portion 65 of the boss 51 is set in the concave portion 57 so as to be fitted on the positioning projection 58, and the cylindrical portion 64 is so set as to be fitted on the positioning pin 59, and thereafter, both split dies 55, 57 are fastened to each other. In this case, it is a matter of course to set the ring core bar 5 in the die 54 as well, although this is not shown. Due to fastening of the die, a cavity 60 for forming the connecting portion 53 and the spoke core bars 6A–6C is provided between the first and second split dies 55 and 56. The cavity 60 is isolated from the yoke portion 65 (concave portion 57) due to presence of the flange 52 and the like.

Figure 14:
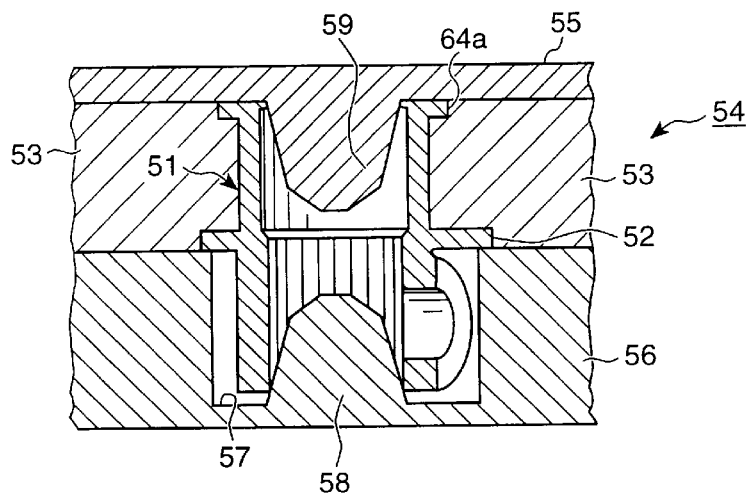
FIG. 14 is a fragmentary sectional view showing a state in which a cavity is filled up with molten aluminum.
Figure 18:
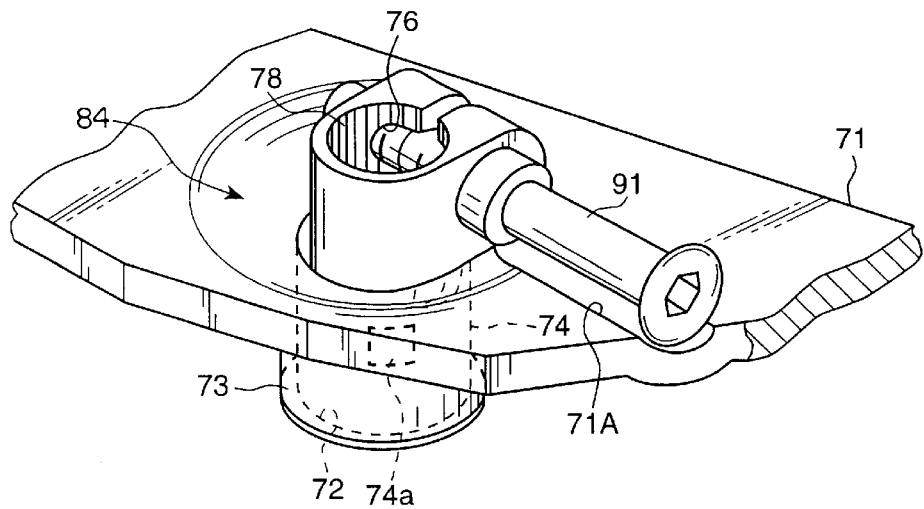
FIG. 18 is a perspective view of the boss structure.

Then, molten aluminum is poured into the cavity 60 to fill it up as shown in FIG. 14. In this case, owing to the presence of the flange 52, the molten aluminum is prevented from flowing to the yoke portion 65 (concave portion 57) within the die 54. Therefore, as described above, the die-cast aluminum is molded around the cylindrical portion 64 with the flange 52 and the flange portion 64a embedded therein, with the result that the connecting portion 53, the spoke core bars 6A–6C and the like are obtained.

Description will now be given of the function and effect of the second embodiment.

(i) As described above, this embodiment basically has substantially the same function and effect as the first embodiment as well. In addition, in this embodiment, since the flange 52 is an integral part of the boss body 66, welding or other like operations may be dispensed with. Therefore, it is possible to avoid warp of the cylindrical portion 64 and deformation of the serration 68 on the inner surface of the cylindrical portion 64 which might be caused otherwise by heat or the like at the time of welding. As a result, the trouble of machining the serration over again, attributed to the warp and deformation, can be avoided.

(j) In this embodiment, the flange 52 is formed in a non-circular shape, and therefore, even when the flange 52 is embedded in the die-cast aluminum, the boss 51 can be restrained from rotating with respect to the connecting portion 53 without fail. As a result, it is possible to avoid the problem attributable to the rotating movement.

Description will now be given of a third embodiment of the present invention with reference to FIGS. 15–19. FIG. 16 is a sectional view of a steering wheel W according to this embodiment, and FIG. 17 is a perspective view showing core bar portions. In the construction of this embodiment, the same components or members as those of the first embodiment are designated by the same reference numerals, and an explanation thereof is omitted. The following description lays special emphasis on the differences of the third embodiment from the first embodiment.

A boss 28 is connected to spoke core bars 6A–6C so as to be integral with a steering wheel body 1. Namely, as shown in FIGS. 15, 17, the boss 28 is connected to the right and left spoke core bars 6B and 6C through a connecting portion 71. In other words, the right and left spoke core bars 6B, 6C are connected to each other by means of the connecting portion 71 which is in turn connected to the boss 28. In this embodiment, the boss 28 is made of steel, while the connecting portion 71, sub-connecting portions 22 and a support bar 24 are each made of die-cast aluminum similarly to the spoke core bars 6B, 6C.

Figure 19:
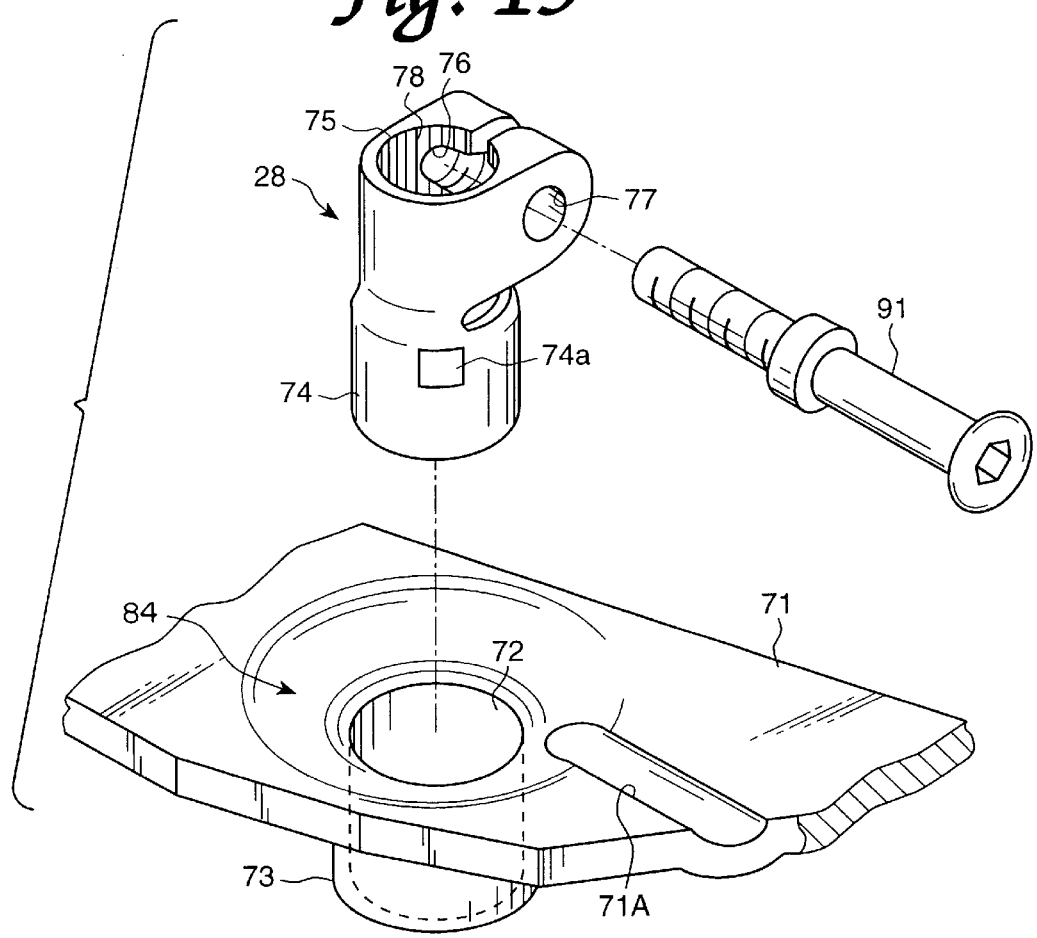
FIG. 19 is an exploded perspective view of the boss structure.

In this embodiment, as shown in FIGS. 15 and 19, a through hole 72 is formed in substantially the central portion of the connecting portion 71. The through hole 72 is formed integrally with a cylinder portion 73 projecting downwardly. The through hole 72 of this embodiment, therefore, has a predetermined depth. Around the peripheral edge of the through hole 72 is formed a concave portion 84 by bending the connecting portion 71. Further, in the surface of the connecting portion 71 is formed a guide groove 71A for guiding a bolt 91 toward the through hole 72. Disposed around the cylinder portion 73 is a relay spiral cable 86.

The through hole 72 is so tapered as to be reduced in diameter towards its lower end. Into the through hole 72 formed by the cylinder portion 73 is press-fitted a cylindrical portion 74 of the boss 28. The cylindrical portion 74 is also tapered at the beginning so as to be reduced in diameter towards its lower end (see FIG. 19), and the outer peripheral surface thereof corresponds to the inner peripheral surface of the through hole 72. Further, the cylindrical portion 74 is formed in a portion of the outer peripheral surface thereof with a partially flattened detent 74a. The through hole 72 is also formed with a detent (not shown) in a portion of the inner peripheral surface thereof corresponding to the detent 74a.

Description will now be given of how to mount the steering wheel W on the steering shaft 30.

In the first place, a ring core bar 5 is formed. This ring core bar 5 is then set in a die (not shown). At this time, a cavity for forming the spoke core bars 6A–6C and the like (including the connecting portion 71, sub-connecting portion 22 and the support bar 24) is defined in the die. Unlike the prior art, the boss is never set in the die of this embodiment as an insert. Therefore, degree of freedom in selecting the shape of the cavity (hence the connecting portion 71, the spoke core bars 6A–6C and the like) can be increased. Then, molten aluminum is poured into the cavity to fill the cavity. Thereafter, by virtue of the aluminum cooling and solidifying, the connecting portion 71 with the through hole 72 and the spoke core bars 6A–6C can be obtained.

The boss 28 is formed separately by means of cold forging, hot forging, machining, press working or the like. Subsequently, the thus-obtained boss 28 is press-fitted in the through hole 72 in such a manner that the detent 74a meets the detent on the inner peripheral surface of the through hole 72. That is to say, the detent 74a also serves as a kind of positioning means. Then, as shown in FIG. 15, the press-fitted boss 28 is increased in diameter such that the tapered end portion of the cylindrical portion 74 extending beyond the distal end of the cylinder portion 73 is subjected to caulking.

Succeedingly, a membrane switch and an air bag device 13 are mounted in the steering wheel body 1 in the same manner as in the first embodiment. Thereafter, the boss 28 is fitted on the distal end of the steering shaft 30 in the same manner as in the first embodiment. When screwing an external thread of the bolt 91 into a through hole 76 formed with an internal thread, the bolt 91 is guided by the guide groove 71A, and therefore the screwing operation can be relatively easily performed even if the position of a yoke portion 75 is relatively low.

Now, description will be given of a function and an effect of the third embodiment.

(k) As described above, in this embodiment, due to adoption of the yoke type boss 28, the steering wheel W can be relatively easily mounted on the steering shaft 30 even in cases where a pad 3 is formed integrally with sheaths 7a, 7b.

(l) In this embodiment, when obtaining the boss structure, the spoke core bars 6A–6C and the connecting portion 21 are first formed in the predetermined shape by die casting, thus making the steering wheel lightweight. At this time, the connecting portion 71 is formed with the tapered through hole 72. Then, the cylindrical portion 74 of the boss 28 formed separately is press-fitted in the through hole 72. Further, the distal end portion of the cylindrical portion 74 is increased in diameter by caulking. Due to this increase in diameter, the boss 28 is firmly fixed to the connecting portion 71.

As described above, unlike the prior art in which the spoke core bars were formed by die casting with the boss set in the die as an insert, it will do in this embodiment to fix the boss 28 after forming the spoke core bars 6A–6C and the like. Therefore, even if the boss 28 is of the type that has an opening (yoke type) like this embodiment, the boss structure can be materialized without fail. Further, the boss 28 can be firmly fixed to the connecting portion 71 due to frictional force between the boss 28 and the inner peripheral surface of the through hole 72 and an increase in diameter of the distal end of the cylindrical portion 74. As a consequence, adoption of the spoke core bars 6A–6C made of die-cast aluminum makes it possible to reduce the weight and increase the degree of freedom in shape of the boss 28. Further, it is possible to ensure the stability of mounting condition.

(m) Particularly, in this embodiment, the cylinder portion 73 is provided in a portion of the connecting portion 71. Therefore, the through hole 72 has a predetermined depth, so that there can be ensured a sufficient contact surface with the boss 28 (cylindrical portion 74). As a consequence, the frictional force can be increased, so that the boss 28 is fixed to the connecting portion 71 more firmly, thereby making it possible to further stabilize the mounting condition.

(n) In this embodiment, since the pad 3 is formed integrally with the sheaths 7a, 7b, a space between the pad 3 and the boss 28 has relatively many restrictions. However, in this embodiment, by forming the concave portion 84 in the connecting portion 71, the yoke portion 75 is allowed to be positioned as low as possible. At the same time, the cylinder portion 73 is made to extend downwardly. This prevents the space above the boss 28 from being obstructed. As a result, it is also possible to effectively utilize the space.

Moreover, in this embodiment, the guide groove 71A for guiding the bolt 91 is formed in the upper surface of the connecting portion 71. It is therefore possible to perform the screwing operation without difficulty even if the yoke portion 75 is positioned as low as possible, thereby making it possible to easily secure the boss 28.

(o) In this embodiment, the boss 28 (cylindrical portion 74) is formed in a portion thereof with the detent 74a and the through hole 72 is formed in the inner peripheral surface thereof with the detent. This contributes to restraining the rotation of the boss 28 relative to the connecting portion 71. It is therefore possible to secure the boss 28 to the connecting portion 71 more firmly.

What is claimed is:

1. A steering wheel assembly mountable on a steering shaft, the steering shaft having a shaft serration composed of a plurality of teeth formed on an outer periphery of the steering shaft, said steering wheel assembly comprising:

a bolt;

a boss adapted to be fitted on the steering shaft, said boss including a cylindrical portion and a yoke portion, said cylindrical portion having a boss serration on an inner periphery thereof corresponding to the shaft serration, said yoke portion provided integrally with said cylindrical portion and having through holes formed sufficiently near both ends thereof to permit said bolt to be received through said through holes when said boss is fitted on the steering shaft, at least one of said through holes being formed with an internal thread; and a steering wheel body including a ring core bar, spoke core bars coupled to said ring core bar, sheaths covering said ring core bar and spoke core bars, and a pad formed integrally with said sheaths, part of said spoke core bars being connected to said boss, wherein said bolt has an external thread formed at least sufficiently close to an end thereof so as to be receivable by said through holes and engageable with said internal threads of said at least one through hole so as to permit said boss, to which said steering wheel body is connected, to be fixed on the steering shaft, and wherein said boss comprises a boss body and a flange formed integrally with the boss body, said boss body including said cylindrical portion and said yoke portion, said flange having a larger area than said yoke portion and being embedded in said spoke core bars.

2. The steering wheel assembly of claim 1, wherein said spoke core bars are made of a die-cast metal.

3. A steering wheel assembly mountable on a steering shaft, the steering shaft having a shaft serration composed of a plurality of teeth formed on an outer periphery of the steering shaft, said steering wheel assembly comprising:

a bolt;

a boss constructed and arranged to be fitted on the steering shaft, said boss including a cylindrical portion and a yoke portion, said cylindrical portion having a boss serration on an inner periphery thereof corresponding to the shaft serration, said yoke portion provided integrally with said cylindrical portion and having through holes formed sufficiently near both ends thereof to permit said bolt to be received through said through holes when said boss is fitted on the steering shaft, at least one of said through holes being formed with an internal thread; and a steering wheel body including a ring core bar, spoke core bars coupled to said ring core bar, sheaths covering said ring core bar and spoke core bars, and an air bag device located in a central upper portion of said ring core bar, part of said spoke core bars being connected to said boss, wherein said bolt has an external thread formed at least sufficiently close to an end thereof so as to be receivable by said through holes and engageable with said internal threads of said at least one through hole so as to permit said boss, to which said steering wheel body is connected, to be fixed on the steering shaft, wherein said boss comprises a boss body and a flange formed integrally with said boss body, said boss body including said cylindrical portion and said yoke portion, said flange having a larger area than said yoke portion and being embedded in said spoke core bars.

4. The steering wheel assembly of claim 3, wherein said spoke core bars are made of a die-cast metal.

5. The steering wheel assembly of claim 3, wherein said steering wheel assembly further comprises a pad which covers said air bag device and is formed integral with said sheaths.

* * * * *